(12) United States Patent
Okada et al.

(10) Patent No.: US 9,187,338 B2
(45) Date of Patent: Nov. 17, 2015

(54) PROCESS FOR MANUFACTURING NEEDLE-SHAPED STRONTIUM CARBONATE PARTICLES

(75) Inventors: Fumio Okada, Ube (JP); Takeshi Himoto, Ube (JP); Masayuki Fujimoto, Ube (JP)

(73) Assignee: Ube Material Industries, Ltd., Yamaguchi (JP)

( * ) Notice: Subject to any disclaimer, the term of this patent is extended or adjusted under 35 U.S.C. 154(b) by 175 days.

(21) Appl. No.: 13/985,322

(22) PCT Filed: Feb. 15, 2012

(86) PCT No.: PCT/JP2012/053479
§ 371 (c)(1),
(2), (4) Date: Nov. 21, 2013

(87) PCT Pub. No.: WO2012/111691
PCT Pub. Date: Aug. 23, 2012

(65) Prior Publication Data
US 2014/0065052 A1    Mar. 6, 2014

(30) Foreign Application Priority Data

Feb. 15, 2011   (JP) ................................. 2011-029945

(51) Int. Cl.
   *C01F 11/18*   (2006.01)
(52) U.S. Cl.
   CPC ........... *C01F 11/187* (2013.01); *C01P 2004/03* (2013.01); *C01P 2004/10* (2013.01); *C01P 2004/54* (2013.01); *C01P 2004/60* (2013.01); *C01P 2004/61* (2013.01); *C01P 2006/12* (2013.01)

(58) Field of Classification Search
   CPC ...................................................... C01F 11/187
   See application file for complete search history.

(56) References Cited

U.S. PATENT DOCUMENTS 6,479,029 B1 *  11/2002  Mingels et al. ............... 423/432

FOREIGN PATENT DOCUMENTS

| JP | 2004-035347 | 2/2004 |
| JP | 2008-247692 | 10/2008 |
| JP | 2010-254533 | 11/2010 |

* cited by examiner

*Primary Examiner* — Stuart Hendrickson
(74) *Attorney, Agent, or Firm* — Nixon Peabody LLP; Jeffrey L. Costellia

(57) ABSTRACT

Acicular strontium carbonate particles are manufactured by introducing gaseous carbon dioxide into an aqueous solution or suspension of strontium hydroxide having a concentration of 1 to 20 wt. %, at a flow rate of 0.5 to 200 mL/min., relative to one gram of the strontium hydroxide, while stirring the solution or suspension in the presence of a dicarboxylic acid, in which the dicarboxylic acid comprises a divalent linear hydrocarbon group having one to four carbon atoms and carboxyl group bonded to each terminals, with the proviso that the linear hydrocarbon group may be substituted with one or more $C_{1-6}$ alkyl groups, and thus carbonating the strontium hydroxide.

6 Claims, 1 Drawing Sheet

PROCESS FOR MANUFACTURING NEEDLE-SHAPED STRONTIUM CARBONATE PARTICLES

FIELD OF THE INVENTION

The present invention relates to a method for manufacturing acicular strontium carbonate particles.

BACKGROUND OF THE INVENTION

The acicular strontium carbonate particles can be incorporated into polymer resin to cancel birefringence of the polymer resin or to give birefringence to the polymer resin. The polymer resin composition of which birefringence is cancelled can be employed for the use as non-birefringent optical resin material or transparent plate. The polymer resin composition which is given birefringence can be employed as retardation plate.

D1(JP 2004-35347 A) describes that a non-birefringent optical resin material can be manufactured by dispersing in polymer material acicular strontium carbonate particles having a length of 500 nm or less under such condition that the length of the acicular strontium carbonate particles are aligned in parallel or perpendicular to the extended bonding chain of the polymer resin so as to cancel the birefringence brought about by the extension of the bonding chain. D1 further describes that the above-mentioned acicular strontium carbonate particles can be manufactured by chilling a mixture of an aqueous strontium salt solution and urea below the freezing point to hydrolyze the urea in the aqueous solution or by the steps of chilling an aqueous strontium hydroxide suspension below the freezing point and introducing gaseous carbon dioxide into the aqueous suspension. D1 discloses in Example 3 that acicular strontium carbonate particles having a mean length of 200 nm or less were manufactured by the above-mentioned procedures.

D2(JP 2008-247692 A) describes fine acicular strontium carbonate particles are manufactured by the steps of placing an aqueous solution containing a carbonate source in an alcohol containing a strontium ion source and then reacting strontium with the carbonate source in the presence of an alkaline agent. D2 contains a working example describing that acicular strontium carbonate particles having a mean length of 200 nm or less were manufactured by the above-mentioned procedures.

D3(JP 2010-254533 A) describes stick-like fine strontium carbonate particles are manufactured by the steps of reacting strontium hydroxide with a carbonate source such as carbon dioxide or a water-soluble carbonate in an aqueous medium in the presence of a particle growth-controlling agent selected from the group consisting of polyhydric alcohols, pyrophosphoric acid, ascorbic acid, carboxylic acids, carboxylates, polycarboxylic acids, and polycarboxylates, whereby producing acicular strontium carbonate particles, and heating the resulting acicular strontium carbonate particles in water to a temperature of 50° C. or higher. An example of the polycarboxylic acid is polyacrylic acid. D3 contains a working example in which stick-like strontium carbonate particles having a mean length of 200 nm or less were manufactured by the above-mentioned procedures. D3 has such description that the stick-like strontium carbonate particles manufactured by the disclosed procedure have a weak contracted portion and, owing to the presence of the weak portion, spherical particles can be easily obtained from the stick-like particles by pulverization procedures such as an airflow-type pulverizer.

SUMMARY OF THE INVENTION

It is required to chill the aqueous strontium salt solution or aqueous when the method of manufacturing acicular strontium carbonate particles described in D1 is carried out.

There are problems in the procedure for manufacturing acicular strontium carbonate particles descried in D2, for instance, an expensive alcohol should be used as the reaction medium and disposal of the employed alcohol is sometimes troublesome.

There also is a problem in the procedure described in D3, for instance, the resulting strontium carbonate stick-like particles easily aggregate to form granular particles and hence it is not easy to disperse the stick-like particles per se in the polymer resin.

Accordingly, it is an object of the invention to provide a method for manufacturing fine acicular strontium carbonate particles hardly forming aggregated granules, without the step of involving the chilling procedure below the freezing point and without employing alcohol.

The present inventors have found that fine acicular strontium carbonate particles that are not liable to form aggregated granules can be manufactured by introducing gaseous carbon dioxide into an aqueous solution or suspension of strontium hydroxide, while stirring the solution or suspension in the presence of a specific dicarboxylic acid, and thus carbonating the strontium hydroxide. The dicarboxylic acid comprises a divalent linear hydrocarbon group having one to four carbon atoms and carboxyl group bonded to each terminals thereof, in which the linear hydrocarbon group may be substituted with one or more $C_{1-6}$ alkyl groups.

The present invention has bee made on the above-mentioned finding.

In more detail, the invention resides in a method for manufacturing acicular strontium carbonate particles which comprises introducing gaseous carbon dioxide into an aqueous solution or suspension of strontium hydroxide having a concentration of 1 to 20 wt. %, at a flow rate of 0.5 to 200 mL/min., relative to one gram of the strontium hydroxide, while stirring the solution or suspension in the presence of a dicarboxylic acid, in which the dicarboxylic acid comprises a divalent linear hydrocarbon group having one to four carbon atoms and carboxyl group bonded to each terminals thereof, with the proviso that the linear hydrocarbon group may be substituted with one or more $C_{1-6}$ alkyl groups, and thus carbonating the strontium hydroxide.

Preferred embodiments of the invention are described below.

(1) The linear hydrocarbon group of the dicarboxylic acid has no hydroxyl group attached thereto.

(2) The linear hydrocarbon group has methyl or ethyl attached thereto.

(3) The dicarboxylic acid is malonic acid containing an alkyl group having 1-6 carbon atoms or maleic acid containing an alkyl group having 1-6 carbon atoms.

(4) The dicarboxylic acid is dissolved in the aqueous solution or suspension of strontium hydroxide in an amount of 1 to 20 weight parts, per 100 weight parts of the strontium hydroxide.

(5) The manufactured acicular strontium carbonate particles have a mean length in the range of 10 to 500 nm and a mean aspect ratio in the range of 2 to 10.

EFFECTS OF THE INVENTION

The method of the invention is employable for manufacturing fine acicular strontium carbonate particles having a mean length of 500 nm or less, particularly 200 nm or less, with no necessity of chilling the aqueous solution or suspension of strontium hydroxide below the freezing point or with no necessity of using a great amount of an alcohol as the reaction solvent. The acicular strontium carbonate particles manufactured by the method of the invention ordinarily are in the form of acicular particles of single crystal and have no weak contracted portion. Hence, the acicular strontium carbonate particles have high strength and are not liable to aggregate. Therefore, the acicular strontium carbonate particles manufactured by the method of the invention are favorably employable as fillers for the use in manufacturing non-birefringent resinous optical materials.

PREFERRED EMBODIMENTS OF THE INVENTION

Figure 1:
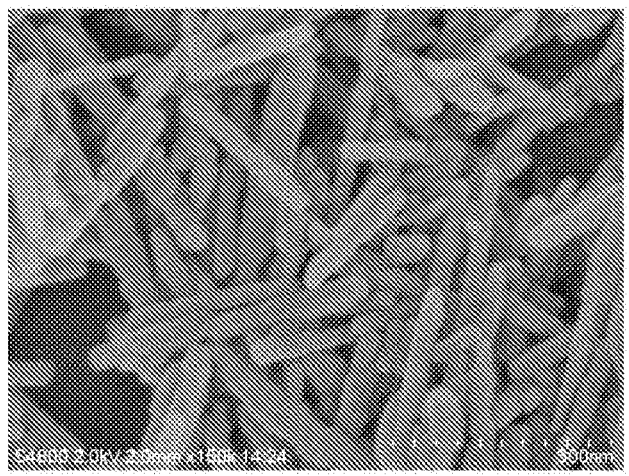
FIG. 1 is a scanning electron microscopic image of the powdery strontium carbonate manufactured in Example 1.

The method of the invention for manufacturing acicular strontium carbonate particles employs an aqueous solution or suspension containing 1 to 20 wt. % of strontium hydroxide. The concentration of the strontium hydroxide in the aqueous solution or suspension is preferably in the range of 2 to 15 wt. %, more preferably in the range of 3 to 8 wt. %.

In the method of the invention, gaseous carbon dioxide is introduced into the aqueous solution or suspension at a flow rate of 0.5 to 200 mL/min., per one gram of the strontium hydroxide, while stirring the aqueous solution or suspension. The flow rate of gaseous carbon dioxide is preferably in the range of 0.5 to 100 mL/min., more preferably in the range of 1 to 50 mL/min.

In the method of the invention, the carbonation of strontium hydroxide is performed in the presence of a dicarboxylic acid comprising a divalent linear hydrocarbon group having one to four carbon atoms. The dicarboxylic acid preferably has the following formula (I):

HOOC—L—COOH  (I)

In the formula (I), L stands for divalent a linear hydrocarbon group having 1-4 carbon atoms. The linear hydrocarbon group may contain a double bond. The number of carbon atoms of the linear hydrocarbon group preferably is in the range of 1 to 3, more preferably 1 or 2. The linear hydrocarbon group preferably has no hydroxyl group attached thereto. The linear hydrocarbon group preferably has an alkyl group having 1-6 carbon atoms, particularly methyl or ethyl, in which a portion or whole of hydrogen atoms are replaced with alkyl groups.

Examples of the dicarboxylic acid include methylmalonic acid, dimethylmalonic acid, ethylmalonic acid, diethylmalonic acid, methylsuccinic acid, 2,2-dimethylsuccinic acid, 2,3-dimethylsuccinic acid, methylmaleic acid (citraconic acid) and dimethylmaleic acid. The dicarboxylic acid is dissolved in the aqueous solution or suspension of strontium hydroxide preferably in an amount of 1 to 20 weight parts, more preferably in an amount of 2 to 15 weight parts, per 100 weight parts of the strontium hydroxide.

It is preferred that the aqueous solution or suspension of strontium hydroxide is ordinarily kept at temperatures in the range of 1 to 100° C., preferably in the range of 5 to 50° C. The carbonation of strontium hydroxide is ordinarily continued until the aqueous solution or suspension reaches pH 7 or less.

The resulting suspension of acicular strontium carbonate particles are dried by a known dryer such as a spray dryer or a drum dryer to give powdery strontium carbonate.

The acicular strontium carbonate particles manufactured by the method of the invention have a mean length ordinarily in the range of 10 to 500 nm, specifically in the range of 10 to 200 nm. The mean length can be determined from the image obtained by SEM (Scanning Electron Microscopy). The image obtained by SEM further indicates that the mean aspect ratio (length/width) in the range of 2 to 10, specifically in the range of 2 to 5.

EXAMPLES

Example 1

In 3 L of pure water (kept to 10° C.) was placed 366 g of strontium hydroxide octahydrates. The resulting mixture was stirred to give an aqueous strontium hydroxide suspension (concentration: 5.6 wt. %). To the aqueous suspension was added 17.2 g (10.3 weight parts per 100 weight parts of strontium hydroxide) of dimethylmalonic acid. The mixture was stirred until the dimethylmalonic acid was dissolved. Subsequently, gaseous carbon dioxide was introduced into the aqueous suspension kept at 10° C., at a flow rate of 3.75 L/min. (corresponding to a flow rate of 22.4 mL/min., per one gram of strontium hydroxide), under stirring, until the aqueous suspension reached pH 7, whereby producing an aqueous suspension of strontium carbonate particles. The stirring was further continued for 30 minutes. The thus manufactured aqueous suspension of strontium carbonate was dried to give powdery strontium carbonate.

FIG. 1 shows a SEM image of the resulting powdery strontium carbonate. The SEM image indicates that the powdery strontium carbonate is in the acicular form. Further, it was determined that the powdery strontium carbonate had a BET specific surface area of 66.3 m²/g. Furthermore, it was determined that the powdery strontium carbonate had a length of 110 nm and a mean aspect ratio of 2.99 by measuring aspect ratios and lengths of 3,000 strontium carbonate particles on the SEM image.

Example 2

The procedures of Example 1 were repeated except for employing 8.5 g (5.1 weight parts per 100 weight parts of strontium hydroxide) of methylmaleic acid in place of dimethylmaleic acid and introducing gaseous carbon dioxide at a flow rate of 0.5 L/min. (corresponding to a flow rate of 3.0 mL/min., per one gram of strontium hydroxide), to manufacture powdery strontium carbonate.

Figure 2:
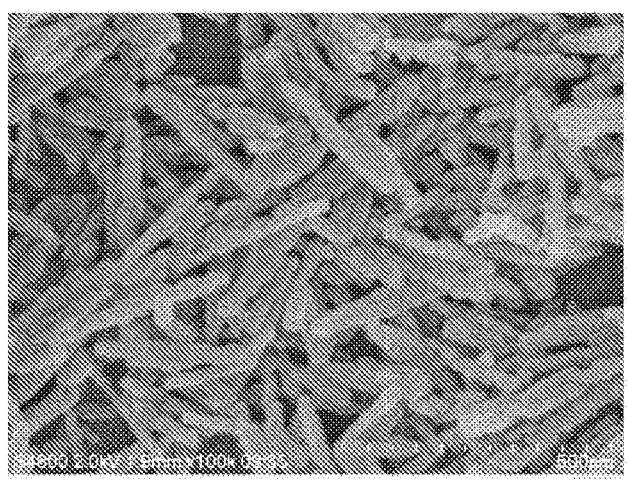
FIG. 2 is a scanning electron microscopic image of the powdery strontium carbonate manufactured in Example 2.

FIG. 2 shows a SEM image of the resulting powdery strontium carbonate. The SEM image indicates that the powdery strontium carbonate is in the acicular form. Further, it was determined that the powdery strontium carbonate had a BET specific surface area of 56.0 m²/g. Furthermore, it was determined that the powdery strontium carbonate had a length of 103 nm and a mean aspect ratio of 2.78 by measuring aspect ratios and lengths of 3,000 strontium carbonate particles on the SEM image.

What is claimed is:

1. A method for manufacturing acicular strontium carbonate particles having a mean length in the range of 10 to 500 nm and a mean aspect ratio in the range of 2 to 10, which comprises introducing gaseous carbon dioxide into an aqueous solution or suspension of strontium hydroxide having a concentration of 1 to 20 wt. %, at a flow rate of 0.5 to 200 mL/min., relative to one gram of the strontium hydroxide, while stirring the solution or sus-pension in the presence of a dicarboxylic acid, in which the dicarboxylic acid comprises a divalent linear hydrocarbon group having one to four carbon atoms and carboxyl group bonded to each terminals thereof, with the proviso that the linear hydrocarbon group is substituted with one or more $C_{1-6}$ alkyl groups, and thus carbonating the strontium hydroxide.

2. The method of claim 1, wherein the linear hydrocarbon group of the dicarboxylic acid has no hydroxyl group attached thereto.

3. The method of claim 1, wherein the linear hydrocarbon group has methyl or ethyl attached thereto.

4. The method of claim 1, wherein the dicarboxylic acid is malonic acid containing an alkyl group having 1 to 6 carbon atoms or maleic acid containing an alkyl group having 1 to 6 carbon atoms.

5. The method of claim 1, wherein the dicarboxylic acid is dissolved in the aqueous solution or suspension of strontium hydroxide in an amount of 1 to 20 weight parts, per 100 weight parts of the strontium hydroxide.

6. The method of claim 1, wherein the dicarboxylic acid is dimethylmalonic acid or methylmaleic acid.

* * * * *